United States Patent
Jendoubi et al.

(10) Patent No.: US 9,732,250 B2
(45) Date of Patent: Aug. 15, 2017

(54) ADHESION PROMOTER COMPOSITION FOR POLYOLEFINIC MEMBRANES

(71) Applicant: SIKA Technology AG, Baar (CH)

(72) Inventors: Elyes Jendoubi, Zürich (CH); Markus Haufe, Zürich (CH); Wilfried Carl, Wädenswil (CH)

(73) Assignee: SIKA TECHNOLOGY AG, Baar (CH)

( * ) Notice: Subject to any disclaimer, the term of this patent is extended or adjusted under 35 U.S.C. 154(b) by 175 days.

(21) Appl. No.: 14/425,682

(22) PCT Filed: Sep. 4, 2013

(86) PCT No.: PCT/EP2013/068294
§ 371 (c)(1),
(2) Date: Mar. 4, 2015

(87) PCT Pub. No.: WO2014/037407
PCT Pub. Date: Mar. 13, 2014

(65) Prior Publication Data
US 2015/0232686 A1    Aug. 20, 2015

(30) Foreign Application Priority Data
Sep. 5, 2012   (EP) .................... 12183170

(51) Int. Cl.
*C09D 133/10* (2006.01)
*C09D 123/28* (2006.01)
*C09D 123/26* (2006.01)

(52) U.S. Cl.
CPC ......... *C09D 133/10* (2013.01); *C09D 123/26* (2013.01); *C09D 123/28* (2013.01)

(58) Field of Classification Search
CPC ... C09D 133/10; C09D 123/26; C09D 123/28
See application file for complete search history.

(56) References Cited

U.S. PATENT DOCUMENTS

| 4,839,448 A | 6/1989 | Jung et al. | |
|---|---|---|---|
| 5,446,083 A * | 8/1995 | Stevens et al. | C08J 7/047 524/458 |

FOREIGN PATENT DOCUMENTS

| DE | 33 38 582 | 4/1984 | |
|---|---|---|---|
| DE | 35 34 858 | 4/1987 | |
| EP | 0 358 033 | 3/1990 | |
| GB | 1 436 888 | 5/1976 | |
| GB | 2 131 439 | 6/1984 | |
| WO | WO-03/095575 | 11/2003 | |
| WO | WO 03095575 A2 * | 11/2003 | C09J 4/06 |

OTHER PUBLICATIONS

Office Action issued on Chinese Application 201380046241.3, mailed Jul. 11, 2016, English translation provided.
International Preliminary Report on Patentability for PCT/EP2013/068294, dated Mar. 19, 2015.
International Search Report for PCT/EP2013/068294, dated Nov. 22, 2013.
Office Action issued on Chinese Application 201380046241.3, dated Mar. 22, 2017, English translation provided.

* cited by examiner

*Primary Examiner* — Nathan M Nutter
(74) *Attorney, Agent, or Firm* — Foley & Lardner LLP

(57) ABSTRACT

Composition, comprising—at least one organic polymer,—at least one monomer from the group of acrylates,—at least one catalyst from the group of tertiary organic amines,—at least one solvent.

14 Claims, 4 Drawing Sheets

ADHESION PROMOTER COMPOSITION FOR POLYOLEFINIC MEMBRANES

CROSS REFERENCE TO RELATED APPLICATIONS

This application is a national stage application of International Application Serial No. PCT/EP2013/068294, filed on Sep. 4, 2013, which in turn claims the benefit of EP 12183170.5, filed on Sep. 5, 2012, all of which are hereby incorporated by reference in their entirety, for any and all purposes.

TECHNICAL FIELD

The invention relates to the field of adhesion promoter compositions that make it possible to durably and structurally bond polyolefinic substrates by pretreating the surface with the adhesion promoter composition and subsequent application of an adhesive.

PRIOR ART

In many application fields, it is necessary to durably bond polyolefinic substrates, for example, in the form of polyolefinic membranes, to other substrates. This is of particular significance in connection with the waterproofing membranes that can be used, for example, for waterproofing flat roofs, steep roofs, in building waterproofing or for tunnel waterproofing. Such polyolefinic substrates, for example, polyethylene, polypropylene or EPDM, are known for their adhesion-unfriendly surface. Such materials can be durably and structurally bonded only if they are subjected to special pretreatment methods. They are usually physical pretreatments, wherein the surface is oxidized, for example, so that the adhesive can bond physically or chemically after application.

Several methods are known from the prior art that allow the bonding of such polyolefinic membranes to other substrates.

According to one method, the bonding occurs by hot air welding. The disadvantage of this method is that, as a rule, a connection to electrical power is required, and it cannot be used if the substrates to be welded have small tight geometries. In addition, it is not possible to bond nonweldable materials using this method. Moreover, this method does not lead to success if the materials to be welded to one another are not compatible. It is in fact possible to weld a PVC substrate to a PVC substrate or a TPO (thermoplastic olefin) substrate to a TPO substrate. However, it is not possible to weld a TPO substrate to a PVC substrate, since these two polymers are not compatible in a welding process.

An additional possibility for structural and permanent bonding of polyolefinic substrates to other substrates is the physical pretreatment of the surface of the polyolefinic substrate, for example, by plasma treatment, flame treatment, etching or similar methods, wherein, after this physical pretreatment, a bonding to the other substrate occurs. However, such pretreatment methods are elaborate and cost intensive. In addition, the pretreatment cannot be carried out on site; instead, it must be integrated already in the manufacture. Since the effect of the pretreatment abates over time, the storage time for substrates thus pretreated is limited, which leads to lack of reproducibility of the bond strength after bonding of the substrates.

Also known in the prior art is the use of polyolefin primers consisting of chloroprene rubber or chlorinated polyolefins in an appropriate solvent. By pretreating the surface of the polyolefinic substrate with such a primer, a good bond strength in the new state and after aging in hot air can be achieved. However, it has been shown that in the case of storage under humid conditions (warm water or 100% air humidity) at increased temperatures (for example, 60° C.), the adhesion rapidly decreases within the briefest time.

Also known from the prior art is the use of borane-initiated adhesives for bonding polyolefinic substrates to other substrates. However, the disadvantage of these adhesives is their high price and the merely low storage stability at 23° C. In addition, these adhesives have the disadvantage that the open time is relatively short, whereas the curing time is very long.

DESCRIPTION OF THE INVENTION

Figure 1:
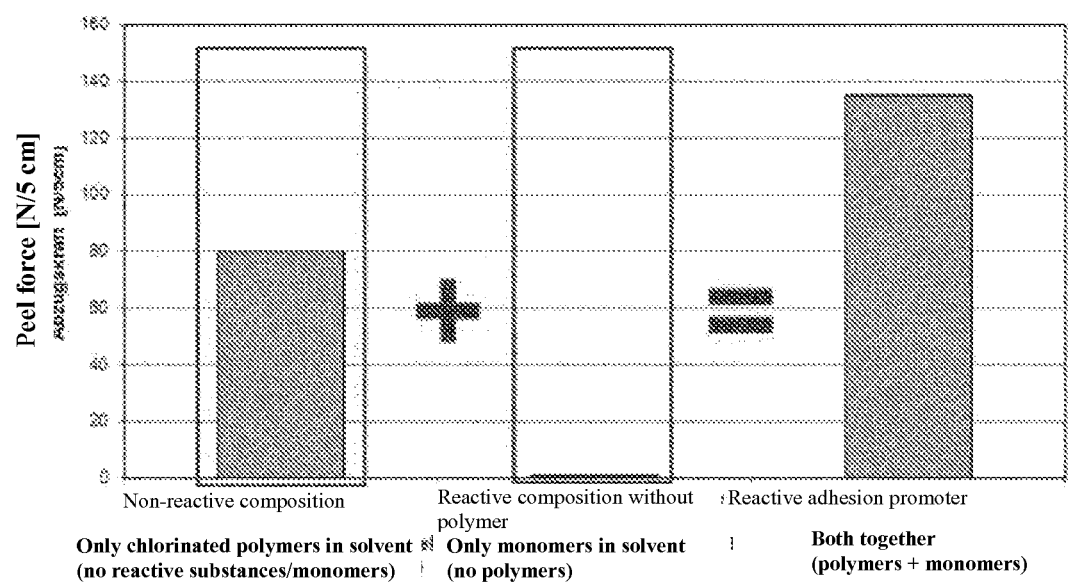
FIG. 1 is an illustration of the combination of a combination of a (non-reactive) polymer with a monomer from the group of (reactive) acrylates that, in cooperation with the other components, namely solvent and catalyst, leads to the surprisingly good action as adhesive.

Therefore, the problem of the present invention is to provide compositions that allow a durable and structural bonding of polyolefinic substrates to other substrates. A further problem of the present invention is to provide a method that allows the durable and structural bonding of polyolefinic substrates to other substrates.

It has been discovered surprisingly that the composition according to claim 1 solves this problem.

In addition, the problem is also solved by the method according to claim 9.

Preferred embodiments are indicated in the dependent claims.

WAYS OF CARRYING OUT THE INVENTION

The subject matter of the present invention is a composition comprising
  at least one organic polymer
  at least one monomer from the group of acrylates
  at least one catalyst from the group of tertiary organic amines
  at least one solvent The described solvent-containing composition is capable of activating the surface of polyolefinic substrates in such a manner that they subsequently can be durably and structurally bonded with an adhesive, in particular with an acrylate adhesive, to other substrates.

The composition according to the invention is a low-viscosity solvent-containing liquid which is applied to the surface to be treated, preferably by brush application or spraying. After drying, the composition forms a film on the surface, which acts as "polarity mediator" between the materials and which can interact with the polyolefins of the substrate as well as with the components of the adhesive. In addition, the composition contains reactive substances that participate in the curing of the adhesive and thus allow a permanent bonding of the surface.

In the present document, substance names starting with "poly," such as polyolefin, for example, denote substances that contain formally two or more of the functional groups occurring in their name per molecule.

In the present document, the term "polymer" covers, on the one hand, a collective of chemically homogeneous macromolecules that differ, however, with regard to polymerization degree, molecular weight and chain length, and that were produced by a polyreaction (polymerization, polyaddition, polycondensation). On the other hand, the term also covers derivatives of such a collective of macromolecules from polyreactions, that is to say compounds that were obtained by reactions, such as, for example, additions or substitutions, of functional groups on given macromolecules and that can be chemically homogenous or chemically inhomogeneous. The term moreover also covers so-called prepolymers, that is to say reactive oligomer preadducts whose functional groups participate in the structure of macromolecules.

In the present document, the term "molecular weight" always denotes the number average molecular weight $M_n$.

Typical application fields of the composition according to the invention are the pretreatment of polyolefinic substrates for bonding in the context of roofing, waterproofing as well as bonding of waterproofing membranes for flat roof, steep roof, building waterproofing and for tunnel waterproofing.

It is preferable for the compositions according to the invention to be such that the organic polymer, the monomer from the group of acrylates and the catalyst from the group of tertiary organic amines are completely dissolved in the solvent.

The production of the composition according to the invention occurs preferably by dissolving the polymer, the monomer from the group of acrylates and the catalyst from the group of tertiary organic amines in the solvent under stirring, preferably at approximately 80° C. for approximately 3 hours under reflux.

The compositions according to the invention are particularly suitable for permanent bonding of polyolefinic membranes, called FPO or TPO (flexible polyolefin or thermoplastic polyolefin), with adhesives, wherein acrylate adhesives are particularly preferable. By pretreatment with these compositions, FPO membranes can be bonded to other FPO membranes or also to other substrates, on which the adhesive presents a good and lasting bonding. The non-FPO substrates, in the sense of the present invention, include in particular PVC membranes and rigid substrates (plastic, concrete and/or metal).

Permanent bonding, in the context of the present invention, refers to a bonding which also has a high bond strength after natural or artificial aging.

The composition according to the invention is characterized in particular in that it allows a bonding of polyolefinic substrates to other substrates that have a markedly high aging capacity.

As adhesives for bonding the substrates after pretreatment of the polyolefinic substrates with the composition according to the invention, it is particularly suitable to use two-component acrylate adhesives, wherein tetrahydrofurfuryl methacrylate- or methyl methacrylate-based systems with peroxide initiation are particularly preferable. After the application of the composition according to the invention and drying with film formation, it is possible, for example, by using such two-component acrylate adhesives, to produce an adhesive bond which is characterized even after aging by unexpected high adhesive forces.

In a particularly preferable embodiment, the composition according to the invention is designed so that the at least one organic polymer comprises at least one chlorinated polyolefin, which is based on hard or soft polypropylene, with a chlorination degree of 20 to 30%, and/or at least one maleic acid anhydride-modified polyolefin.

Particularly good results are achieved if the at least one organic polymer comprises at least one or more polymers from the following:

A hard polyolefin with a chlorination degree of 20-30% and a molecular weight of 150,000 g/mol (Poly1).

A soft polyolefin with a chlorination degree of 20-30% and a molecular weight of 100,000 g/mol (Poly2).

A hard polyolefin with a chlorination degree of 20-30%, a maleic acid anhydride content of 1 to 2% and a molecular weight of 60,000 g/mol (Poly3).

A soft polyolefin with a chlorination degree of 20-30%, a maleic acid anhydride content of 1 to 2% and a molecular weight of 65,000 g/mol (Poly4).

The compositions according to the invention moreover comprise at least one monomer from the group of acrylates. While generally all the monomers from the group of acrylates are suitable, it has been shown that particularly good results are achieved if the at least one monomer from the group of acrylates comprises an acrylate ester and/or a methacrylate ester, particularly in the form of one or more from methyl methacrylate, butyl methacrylate and lauryl methacrylate.

Moreover, the compositions according to the invention comprise at least one catalyst from the group of tertiary organic amines. Aromatic tertiary amines have been shown to be particularly suitable.

Examples of suitable tertiary aromatic amines are, in particular, tertiary aromatic amines selected from the group consisting of: N,N-dimethylaniline, N,N-diethylaniline, N,N-bis(hydroxyalkyl)aniline such as N,N-bis(2-hydroxyethyl)aniline, N,N-alkylhydroxyalkylaniline such as N-ethyl-N-hydroxyethylaniline, N,N-dimethyl-p-toluidine, N,N-diethyl-p-toluidine, N-methyl-N-hydroxyethyl-p-toluidine, N,N-bis(2-hydroxyethyl)-p-toluidine as well as alkoxylated N,N-bis-(hydroxyethyl)-p-toluidine, N-ethoxylated p-toluidine, N,N-bis(2-hydroxyethyl)-xylidine, N-alkylmorpholine and mixtures thereof.

In a particularly preferable embodiment, the composition according to the invention is designed so that the at least one catalyst from the group of tertiary organic amines comprises N,N-bis-(2-hydroxyethyl)-para-tolui dine ("BISOMER® PTE").

In a particularly preferable embodiment, the at least one solvent is an organic solvent, wherein solvents from the group of aromatic solvents, in particular alkyl aromatic compounds, are particularly preferable. It has been shown that particularly good results are achieved if xylene is used as solvent.

It is particularly preferable for the compositions according to the invention to be such that all the components are dissolved in the solvent.

Particularly good results are achieved if the composition according to the invention is designed so that the individual components are in a ratio by weight such that the adhesion promoter composition comprises:

approximately 1 to 10 parts by weight, in particular approximately 4 to 7 parts by weight of at least one organic polymer approximately 3 to 20, in particular approximately 10 to 15 parts by weight of at least one monomer from the group of acrylates approximately 3 to 16, in particular approximately 5 to 10 parts by weight of at least one catalyst from the group of tertiary organic amines approximately 54 to 93 parts by weight, in particular approximately 68 to 87 parts by weight of at least one solvent.

It has been shown that the compositions according to the invention, after application and drying on apolar surfaces, surprisingly act as adhesive. Here, the inventors suspect that it is precisely the combination of a (non-reactive) polymer with a monomer from the group of (reactive) acrylates that, in cooperation with the other components, namely solvent and catalyst, leads to the surprisingly good action as adhesive. This principle is illustrated diagrammatically in FIG. 1.

Another subject matter of the present invention is the use of the composition according to the invention for treating the surface of a polyolefinic substrate. As a result of this treatment, which occurs preferably by application by brushing onto or spraying of the surface of the polyolefinic substrate to be treated and subsequent drying of the treated site, the surface of the substrate to be treated is activated so that, in a subsequent step, for example, by use of an acrylate adhesive, a permanent bonding of the thus treated surface to another substrate is possible.

An additional subject matter of the present invention is a method for the surface treatment of a polyolefinic substrate. The method according to the invention is designed so that a composition according to the invention is applied to the surface of a polyolefinic substrate and subsequently dried.

In a preferred embodiment of the method according to the invention, after drying of the applied composition, an adhesive is applied to the site thus pretreated, and the polyolefinic substrate is subsequently bonded to another substrate. For the bonding of the pretreated polyolefinic substrate, it is preferable to use an acrylic adhesive, in particular in the form of a two-component acrylate adhesive, wherein it is preferable to use tetrahydrofurfuryl methacrylate- or methyl methacrylate-based systems with peroxide initiation.

In a particularly preferred embodiment of the method according to the invention, the polyolefinic substrate is a waterproofing membrane, in particular from the field of flat roof waterproofing, steep roof waterproofing, building waterproofing and/or tunnel waterproofing, wherein bonding to a thermoplastic olefin membrane, to a PVC membrane, to a metallic substrate or to a concrete substrate, for example, occurs.

The teaching according to the invention will now be explained in further detail in the following examples.

EXAMPLES

Example 1

Determination of the Peel Force in the Pretreatment with the Composition According to the Invention as a Function of the Polymer Content of the Composition A composition for pretreating polyolefinic substrates was produced with the following components:

| | |
|---|---|
| Polymer mixture | Poly1, Poly2, Poly3 and Poly4 (see above) |
| Monomer component | Butyl methacrylate |
| Catalyst | BISOMER® PTE |
| Solvent | Xylene |

From the mentioned components, a composition according to the invention was prepared, wherein the following quantitative proportions were used:

| | |
|---|---|
| Polymer component | 0, 1, 2, 3, 4, 5, 6, 7, 8, 9 and 10% by weight |
| Monomer component | 10% by weight |
| Catalyst | 6% by weight |
| Solvent | 84, 83, 82, 81, 80, 79, 78, 77, 76, 75 and 74% by weight |

By varying the percentage by weight of the polymer component from 0 to 10% by weight, it was possible to carry out an optimization of the polymer content.

For this purpose, the substrate SARNAFIL® FPO Roofing Membrane (a thermoplastic roofing membrane) was pretreated with the compositions according to the invention and, after drying for 30 minutes, bonded using the adhesive SIKAFAST®-5221 (a reactive 2-component acrylic adhesive) to the substrate SARNAFIL® FPO Roofing Membrane.

After curing the adhesive composition for 4 hours at 23° C., the peel force of the adhesive bond was determined for the compositions with the different polymer contents.

The results for the different polymer contents are listed in Table 1.

TABLE 1

| Concentration [%] | Peel force [N/5 cm] |
|---|---|
| 0 | 1 |
| 1 | 18 |
| 2 | 21.5 |
| 3 | 54 |
| 4 | 75 |
| 5 | 75 |
| 6 | 75 |
| 7 | 61.5 |
| 8 | 52 |

Figure 2:
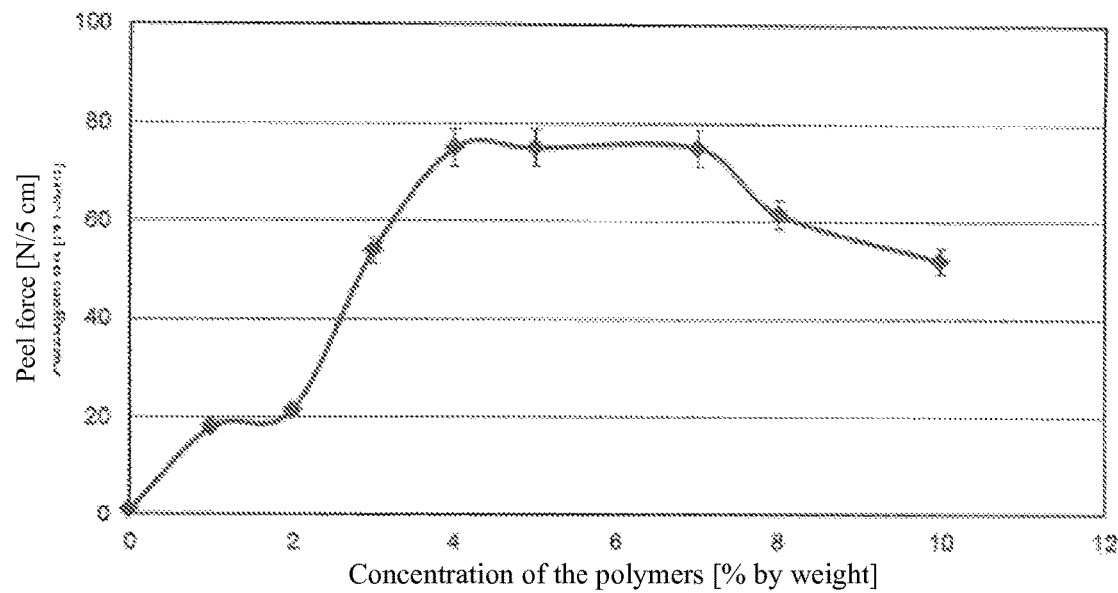
FIG. 2 is a graphic representation of the results set forth in Table 1 of Example 1.

The results reproduced in Table 1 are represented graphically in FIG. 2.

Example 2

Determination of the Peel Force in the Pretreatment with the Composition According to the Invention as a Function of the Monomer Content of the Composition A composition for pretreating polyolefinic substrates was produced with the following components:

| | |
|---|---|
| Polymer mixture | Poly1, Poly2, Poly3 and Poly4 (see above) |
| Monomer component | Butyl methacrylate |
| Catalyst | BISOMER® PTE |
| Solvent | Xylene |

From the mentioned components, a composition according to the invention was produced, wherein the following quantitative proportions were used:

| | |
|---|---|
| Polymer component | 6% by weight (for each polymer 1.5% by weight) |
| Monomer component | 0, 3, 6, 12, 20% by weight |
| Catalyst | 6% by weight |
| Solvent | 88, 85, 82, 76 and 68% by weight |

By varying the percentage by weight of the monomer component from 0 to 20% by weight, an optimization of the monomer content was successfully carried out.

For this purpose, the substrate SARNAFIL® FPO Roofing Membrane was pretreated with the composition according to the invention and, after drying for 30 minutes, bonded using the adhesive SIKAFAST®-5221 to the substrate SARNAFIL® FPO Roofing Membrane.

After curing the adhesive composition for 4 hours at 23° C., the peel force of the adhesive bond for the compositions with different monomer contents was determined.

The results for the different monomer contents are listed in Table 2.

TABLE 2

| Concentration [%] | Peel force [N/5 cm] |
|---|---|
| 0 | 127 |
| 3 | 130 |
| 6 | 140 |
| 12 | 198 |
| 20 | 147 |

Figure 3:
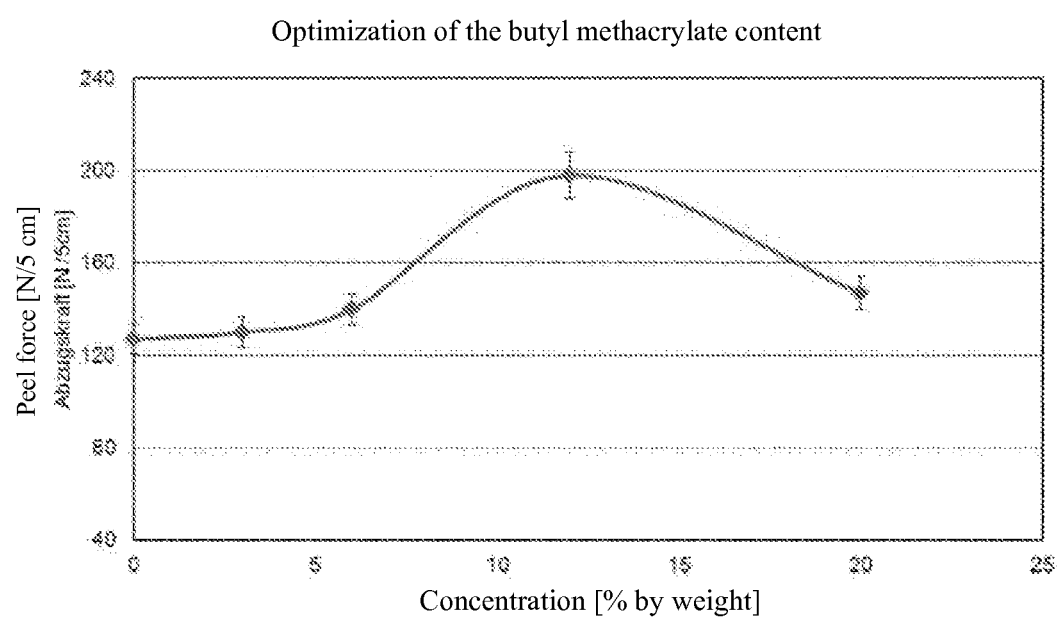
FIG. 3 is a graphic representation of the results set forth in Table 2 of Example 2.

The results indicated in Table 2 are graphically represented in FIG. 3.

Example 3

Determination of the Peel Force in the Pretreatment with the Composition According to the Invention as a Function of the Catalyst Content of the Composition A composition for pretreating polyolefinic substrates was produced with the following components:

| | |
|---|---|
| Polymer mixture | Poly1, Poly2, Poly3 and Poly4 (see above) |
| Monomer component | Butyl methacrylate |
| Catalyst | BISOMER® PTE |
| Solvent | Xylene |

From the mentioned components, a composition according to the invention was produced, wherein the following quantitative proportions were used:

| | |
|---|---|
| Polymer component | 6% by weight (for each polymer 1.5% by weight) |
| Monomer component | 10% by weight |
| Catalyst | 0, 3, 6, 12% by weight |
| Solvent | 84, 81, 78 and 72% by weight |

By varying the percentage by weight of the catalyst component from 0 to 12% by weight an optimization of the catalyst content was successfully carried out.

For this purpose, the substrate SARNAFIL® FPO Roofing Membrane was pretreated with the composition according to the invention and, after drying for 30 minutes, bonded using the adhesive SIKAFAST®-5221 to the substrate SARNAFIL® FPO Roofing Membrane.

After curing the adhesive bond for 4 hours at 23° C., the peel force of the adhesive bond for the compositions with the different polymer contents was determined.

The results for the different catalyst contents are listed in Table 3.

TABLE 3

| Concentration [%] | Peel force [N/5 cm] |
|---|---|
| 0 | 86 |
| 3 | 93 |
| 6 | 135 |
| 12 | 121 |

Figure 4:
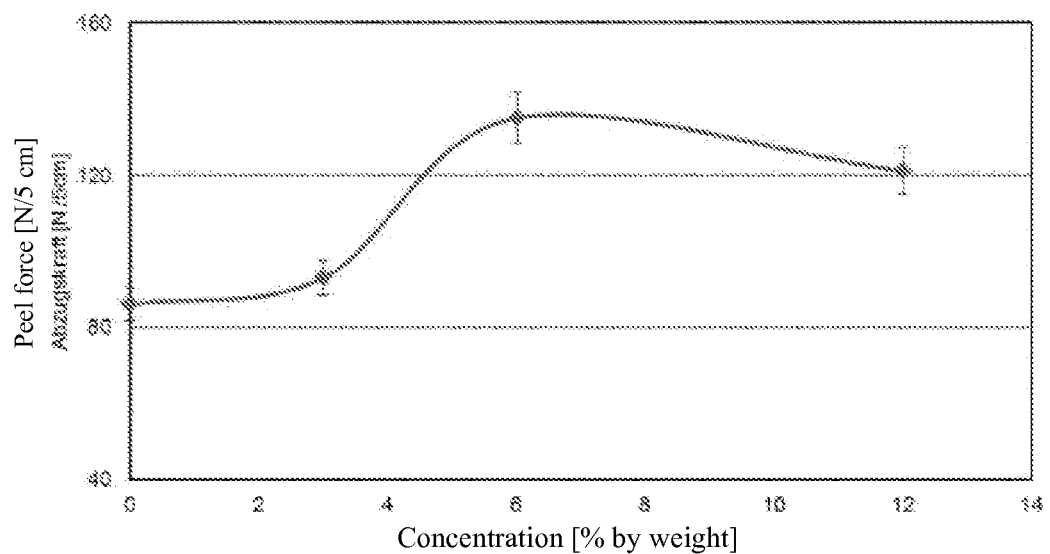
FIG. 4 is a graphic representation of the results set forth in Table 3 of Example 3.

The results reproduced in Table 3 are represented graphically in FIG. 4.

Example 4

Comparison of the Composition According to the Invention to Compositions from the Prior Art For the comparison test, a composition according to the invention was used, which contained the following components in the following weight ratios:

| | |
|---|---|
| Polymer component | 6% by weight (for each polymer 1.5% by weight) |
| Monomer component | 10% by weight |
| Catalyst | 6% by weight |
| Solvent | 78% by weight |

For the comparison tests, a TPO substrate was pretreated with the composition according to the invention and, after drying for 30 minutes, bonded using the adhesive SIKAFAST®-5221 to a TPO substrate.

After curing the adhesive bond for 4 hours at 23° C., the peel force of the adhesive bond was determined. Moreover, the peel force after aging in water for 28 days at 70° C. was determined. The same tests were also carried out with the pretreatment compositions known from the prior art. The result is shown in Table 4.

TABLE 4

Examples for the aging (4 weeks 70° C. warm water):
TPO-TPO bonding

| | Peel Force [N/5 cm] | |
|---|---|---|
| Primer | Initial | After aging |
| ROWA Primer: TRAPYLEN® 187 EAC (a solvent-based solution of a chlorinated polyolefin | 60 | 0 |
| 5% polymer (Toyobo HARDLEN® F-2P; an adhesion promoter resin grafted with chlorine and/or maleic anhydride) dissolved in THF + xylene (50:50) | 80 | 0 |
| 5% polymer (Toyobo HARDLEN® 16-LP; an adhesion promoter resin grafted with chlorine and/or maleic anhydride) dissolved in THF + xylene (50:50) | 60 | 0 |
| Composition according to the invention | 135 | 140 |

For an additional comparison example, a TPO substrate was pretreated with the composition according to the invention and, after drying for 30 minutes, bonded using the adhesive SIKAFAST®-5221) to a PVC substrate.

After curing of the adhesive bond for 4 hours at 23° C., the peel force of the adhesive bond was determined. Moreover, the peel force after aging in water for 28 days at 70°

C. was determined. The same tests were also carried out with pretreatment compositions known from the prior art. The result is shown in Table 5.

TABLE 5

TPO-PVC bonding

| Primer | Peel Force [N/5 cm] | |
| --- | --- | --- |
| | Initial | After aging |
| ROWA Primer: TRAPYLEN® 187 EAC | 11 | 0 |
| 5% polymer (Toyobo HARDLEN® F-2P) dissolved in THF + xylene (50:50) | 12 | 0 |
| 5% polymer (Toyobo HARDLEN® 16-LP) dissolved in THF + xylene (50:50) | 15 | 0 |
| Composition according to the invention | 140 | 200 |

The invention claimed is:

1. A composition comprising
at least one organic polymer comprising:
   a hard chlorinated polyolefin with a chlorination degree of 20-30% and a molecular weight of at least 150,000 g/mol (Poly1); or
   a soft chlorinated polyolefin with a chlorination degree of 20-30% and a molecular weight of at least 100,000 g/mol (Poly2);
at least one monomer from the group of alkyl acrylate esters and alkyl methacrylate esters;
at least one catalyst from the group of tertiary organic amines; and
at least one solvent.

2. The composition of claim 1, wherein the at least one organic polymer further comprises:
   a hard polyolefin with a chlorination degree of 20-30%, a maleic acid anhydride content of 1 to 2% and a molecular weight of 60,000 g/mol (Poly3); or a soft polyolefin with a chlorination degree of 20-30%, a maleic acid anhydride content of 1 to 2% and a molecular weight of 65,000 g/mol (Poly4).

3. The composition of claim 1, wherein the at least one catalyst from the group of tertiary organic amines comprises an aniline derivative.

4. The composition of claim 1, wherein the at least one solvent comprises an alkyl aromatic solvent.

5. The composition of claim 1 further comprising an adhesion promoter.

6. A method for surface treatment of a polyolefinic substrate, the method comprising: applying a composition to the surface of a polyolefinic substrate, and subsequently drying the composition, wherein the composition comprises:
   at least one organic polymer comprising:
      a hard chlorinated polyolefin with a chlorination degree of 20-30% and a molecular weight of at least 150,000 g/mol (Poly1); or
      a soft chlorinated polyolefin with a chlorination degree of 20-30% and a molecular weight of at least 100,000 g/mol (Poly2);
   at least one monomer from the group of alkyl acrylate esters and alkyl methacrylate esters;
   at least one catalyst from the group of tertiary organic amines; and
   at least one solvent.

7. The method of claim 6 further comprising after drying, bonding the polyolefinic substrate to another substrate.

8. The method of claim 6, wherein after the drying of the applied composition, an adhesive is applied.

9. The method of claim 6, wherein the polyolefinic substrate is a waterproofing.

10. The composition of claim 1, wherein the at least one monomer from the group of acrylates comprises a methyl methacrylate, butyl methacrylate, or lauryl methacrylate.

11. The composition of claim 1, wherein the at least one catalyst from the group of tertiary organic amines comprises N,N-bis-(2-hydroxyethyl)-para-toluidine.

12. The composition of claim 1, wherein the at least one solvent comprises xylene.

13. The composition of claim 5, wherein the adhesion promoter comprises:
   about 1 to 10 parts by weight of the at least one organic polymer;
   about 3 to 20 parts by weight of the at least one monomer from the group of acrylates;
   about 3 to 16 parts by weight of the at least one catalyst from the group of tertiary organic amines; and
   about 54 to 93 parts by weight of the at least one solvent.

14. The composition of claim 5, wherein the adhesion promoter comprises:
   about 4 to 7 parts by weight of the at least one organic polymer;
   about 10 to 15 parts by weight of the at least one monomer from the group of acrylates;
   about 5 to 10 parts by weight of the at least one catalyst from the group of tertiary organic amines; and
   about 68 to 87 parts by weight of the at least one solvent.

* * * * *